(No Model.)

J. J. POWERS & R. VAN BUREN.
JUNCTION BOX.

No. 497,601. Patented May 16, 1893.

WITNESSES:
C. Neveux
C. Sedgwick

INVENTORS:
J. J. Powers
R. Van Buren
BY Munn & Co
ATTORNEYS.

THE NORRIS PETERS CO., PHOTO-LITHO., WASHINGTON, D. C.

UNITED STATES PATENT OFFICE.

JAMES J. POWERS AND ROBERT VAN BUREN, OF BROOKLYN, NEW YORK.

JUNCTION-BOX.

SPECIFICATION forming part of Letters Patent No. 497,601, dated May 16, 1893.

Application filed December 27, 1892. Serial No. 456,495. (No model.)

*To all whom it may concern:*

Be it known that we, JAMES J. POWERS and ROBERT VAN BUREN, both of Brooklyn, in the county of Kings and State of New York, have invented a new and Improved Connection-Box and Fitting for Electrical Conduits, of which the following is a specification, reference being had to the annexed drawings, forming a part thereof, in which—

Figure 1:
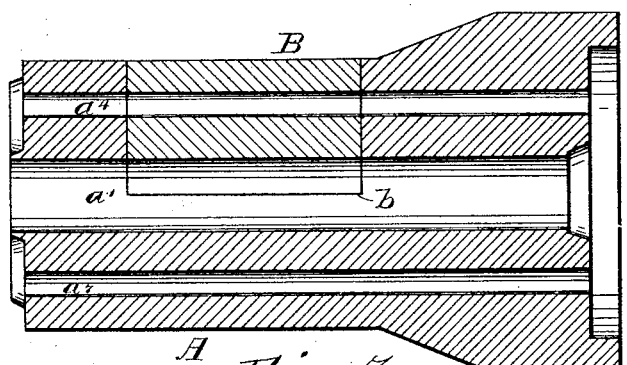
Figure 2:
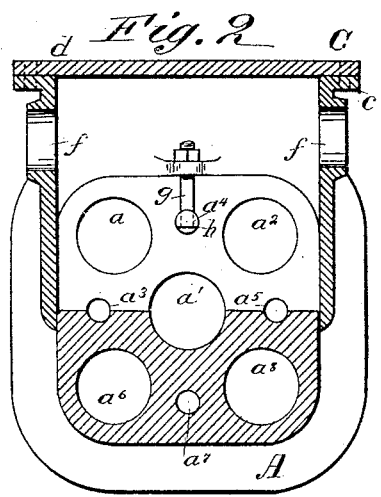
Figure 3:
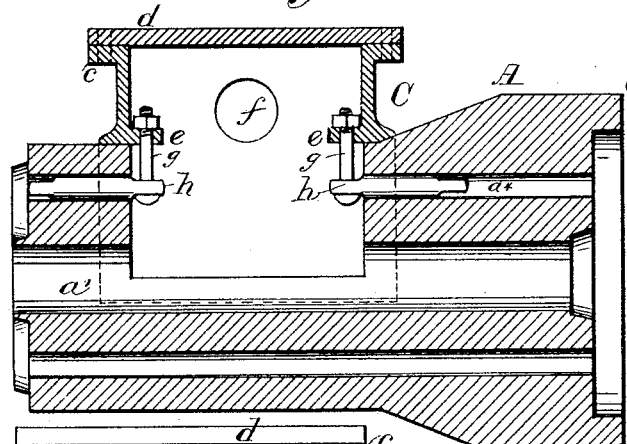
Figure 5:
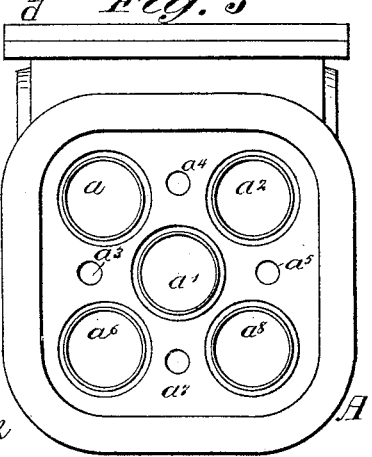
Figure 6:
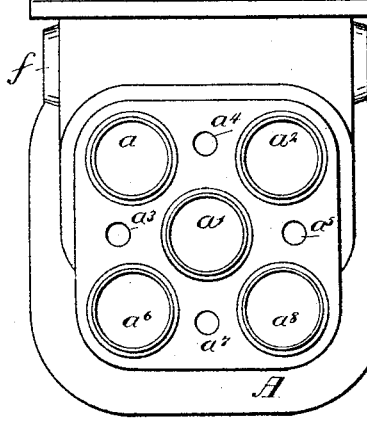
Figure 4:
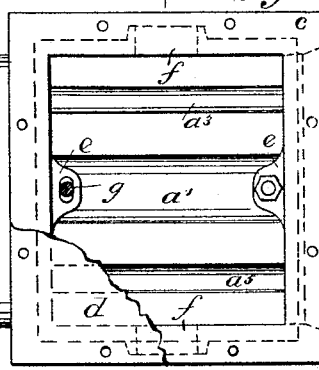

Figure 1 is a longitudinal section of a single piece of conduit provided with a removable portion. Fig. 2 is a cross section on line 2—2 in Fig. 4. Fig. 3 is a longitudinal section. Fig. 4 is a plan view. Fig. 5 is an end view showing the larger end of the conduit section; and Fig. 6 is an end view showing the smaller end of the same.

Similar letters of reference indicate corresponding parts in all the views.

The object of our invention is to construct a connection box and fitting for electrical conduits, which will permit of the laying of the conduit without any break or interruption, and at the same time allow of making connections without in any way disturbing the conduit.

Our invention consists in a conduit section provided with a removable portion cemented or otherwise secured in place, and a fitting for application to the conduit, which will permit of ready access to the conductors, thus allowing connections to be made or altered at any time without disturbing the conduit or other wires than those with which connection is to be made.

The conduit section A, which is preferably formed of clay molded and baked according to well known methods, is provided with series of longitudinal holes $a$ to $a^8$, inclusive, for receiving the electrical conductors, and is furnished with a removable section B, the removal of which permits of access to the longitudinal holes $a$, $a'$, $a^2$, $a^3$, $a^4$, $a^5$. The conduit section A is molded according to a well known method invented and patented by us, and immediately after it is molded, and before it is dried (preparatory to baking) a rectangular notch $b$ is cut in the molded section and removed, after which the conduit section is dried and baked and the removed portion is also dried and baked, and afterward the section which was removed is replaced and cemented, thus completing the conduit section so that it may be laid in the same manner as other sections, and the sections are placed at suitable intervals in the conduit.

When it is desired to gain access to the wires running through the conduit, the removable section B is broken and removed, and a fitting C is placed over the opening thus made, the said fitting being in the form of a rectangular box with an open top and bottom, the sides of the lower portion being prolonged and curved to fit over the surface of the conductor. The upper portion of the fitting C is provided with an apertured flange $c$, to which is bolted the cover $d$. The said fitting is furnished with perforated, inwardly-projecting ears $e$, and in the sides of the fitting are formed openings $f$, through which the service wires are taken.

The fitting is held in place by eye-bars $h$, inserted in the apertures $a^4$ of the conduit and bolts $g$ extending downwardly through the apertured ears $e$ and through the eyes of the bars. The joint between the fitting and the conduit section is completed by the use of cement placed between the fitting and the conduit or on the outside around the fitting.

With our improved construction we are enabled to provide a safe and inexpensive conduit which admits of readily forming the connections for service wires.

Having thus described our invention, we claim as new and desire to secure by Letters Patent—

1. An electrical conduit section, formed of clay or analogous material and having a removable portion, and a fitting consisting of a box adapted to the side of the conduit and provided with a removable cover and apertures for the service wires, substantially as specified.

2. The combination, with an electrical conduit section provided with longitudinal holes and a side opening, of a fitting of suitable material such as iron, adapted to the side of the conduit section and provided with inwardly-projecting, apertured ears, eye-bars entering the holes of the conduit section, and bolts passing through the eye-bars and the ears of the fitting, substantially as specified.

JAMES J. POWERS.
ROBERT VAN BUREN.

Witnesses:
F. W. HANAFORD,
EDGAR TATE.